United States Patent
Tan

(10) Patent No.: US 8,852,473 B1
(45) Date of Patent: Oct. 7, 2014

(54) REINFORCED POLYMER COMPOSITE FOAMS AND METHOD OF MANUFACTURE

(75) Inventor: Seng Tan, Beavercreek, OH (US)

(73) Assignee: Wright Materials Research Co., Beavercreek, OH (US)

( * ) Notice: Subject to any disclaimer, the term of this patent is extended or adjusted under 35 U.S.C. 154(b) by 395 days.

(21) Appl. No.: 12/284,564

(22) Filed: Sep. 23, 2008

(51) Int. Cl.
*B29C 44/04* (2006.01)

(52) U.S. Cl.
USPC ......... 264/45.1; 264/413; 264/415; 264/45.3; 264/46.7; 264/46.8; 264/50; 264/51; 264/642; 264/241; 264/242; 264/248; 264/251; 264/271.1; 264/259; 264/260; 264/261

(58) Field of Classification Search
USPC ............. 264/36.11, 45.1, 916, 45.3, 46.7, 50, 264/51, 241, 242, 248, 259, 260, 261, 46.2, 264/1.7, 440, 471, 480, 487, 490, 493, 642, 264/643, 171.26, 494–496
See application file for complete search history.

(56) References Cited

U.S. PATENT DOCUMENTS

| | | | | |
|---|---|---|---|---|
| 3,647,608 A | * | 3/1972 | Enlow et al. | 442/371 |
| 4,808,461 A | | 2/1989 | Boyce et al. | |
| 5,106,928 A | * | 4/1992 | Skoultchi et al. | 526/196 |
| 5,186,776 A | | 2/1993 | Boyce et al. | |
| 5,466,506 A | * | 11/1995 | Freitas et al. | 428/105 |
| 5,624,622 A | * | 4/1997 | Boyce et al. | 264/258 |
| 5,736,222 A | | 4/1998 | Childress | |
| 5,863,635 A | * | 1/1999 | Childress | 428/119 |
| 5,875,792 A | * | 3/1999 | Campbell et al. | 132/246 |
| 5,935,475 A | | 8/1999 | Scoles et al. | |
| 5,980,665 A | | 11/1999 | Childress | |
| 6,232,354 B1 | * | 5/2001 | Tan | 521/60 |
| 6,291,049 B1 | * | 9/2001 | Kunkel et al. | 428/99 |
| 7,105,071 B2 | | 9/2006 | Johnson et al. | |
| 7,387,147 B2 | | 6/2008 | Johnson | |
| 2004/0121138 A1 | * | 6/2004 | Carstensen | 428/304.4 |

FOREIGN PATENT DOCUMENTS

WO    WO 02/12379    *    2/2002

* cited by examiner

*Primary Examiner* — Jeffrey Wollschlager
*Assistant Examiner* — Stella Yi

(57) ABSTRACT

A pin or tube reinforced polymeric foam and a method of manufacture thereof. The reinforcing pins or tubes are incorporated into the polymeric foam during or after fabrication of the reinforced polymer foam and are preferably coated with an adhesive or binder layer prior to fabrication.

13 Claims, 6 Drawing Sheets

REINFORCED POLYMER COMPOSITE FOAMS AND METHOD OF MANUFACTURE

The United State of America may have certain rights in this application under the terms of grant IIP-0740089 from the U.S. National Science Foundation.

FIELD OF THE INVENTION

The present invention relates to polymer foams and laminates and more particularly to such materials that are reinforced with pins and tubes.

BACKGROUND OF THE INVENTION

Pins made from graphite, resin and titanium have been used in the fabrication or composite structures comprising a foam core and facesheets. The purpose of the pins is to enhance the peel strength (interlaminar strength) between the composite layers and between the facesheet and the foam core in the case of sandwich structures. U.S. Pat. No. 5,736,222 (Childress), U.S. Pat. No. 4,808,461 (Boyce et al.), U.S. Pat. No. 5,980,665 (Childress) and U.S. Pat. No. 5,935,475 (Scoles and Woodley) describe techniques for the insertion of pins into composite structures. These patents all use low-density degradable polymer foams as pin carriers to install pins into B-staged composites during autoclaving at elevated temperatures and pressures. During autoclaving, the foam decomposes and the pins are pushed into the B-staged composite by external pressure acting on the caul plate. Low-density polymethacrylic imide foams (ROHACELL™) and polystyrene (STYROFOAM™) are used in these applications. Thus, in these prior art processes, the polymer foam is used as a pin carrier and sacrificial medium, as opposed to a structural element that remains permanently in the composite foam after fabrication as in the case of the instantly described and claimed process.

Other patents like U.S. Pat. No. 5,186,776 (Boyce et al.), U.S. Pat. No. 7,387,147 B2 (Johnson et al.) and U.S. Pat. No. 7,105,071 B2 (Johnson et al.) describe techniques for inserting Z-pins into fiber reinforced polymeric composites. To avoid damage to the fiber in the composite these patents utilize techniques that soften the composite allowing the pins to deflect the fiber when they penetrate the composite. Such softening can negatively affect the properties of the composite Structural foams useful in composite or sandwich structures are currently processed from polymers like polymethacrylic imide and polyvinyl urea-amides. Other commonly used polymer foams include polyurethanes, polyimides, polyethylene, polycarbonate, phenolics, elastomers, and acrylics. Thermotropic liquid crystalline polymers (LCPs) have been extensively studied in recent years for electronic applications because of their high thermal, mechanical and chemical properties. Specifically useful foams and their methods of manufacture are described in greater detail in commonly assigned U.S. Pat. No. 6,232,354 and U.S. patent application Ser. No. 11/807,488, both of which are incorporated herein by reference in their entirety.

Thus, while structurally desirable foams and their methods of manufacture as well as pin or tube reinforced composites have been described in the prior art the marriage of these two technologies to provide superior structural composites and methods for their manufacture has neither been described nor suggested.

OBJECT OF THE INVENTION

It is therefore an object of the present invention to provide enhanced structural composite materials that marry the technologies of structurally sound engineering polymer foams with tube and/or pin reinforcement and methods for their manufacture.

SUMMARY OF THE INVENTION

According to the present invention there are provided a pin or tube reinforced polymeric foam and a method of manufacture thereof. The reinforcing pins or tubes are incorporated into the polymeric foam during or after fabrication of the reinforced polymer foam and may be, but are not necessarily, coated with an adhesive or binder layer prior to fabrication.

DETAILED DESCRIPTION

As used herein, the term "pin" is meant to refer to a solid elongated structure whose length is a multiple of its diameter and the term "tube" is meant to define a hollow structure whose length is a multiple of its diameter. The terms "High Performance Polymer" and "Engineering Polymer" are meant to refer to materials having a thermal resistance greater than 150° C. and materials having a thermal resistance between about 100° C. and about 150° C. respectively. Specific examples of such materials are presented hereinafter.

Figure 1:
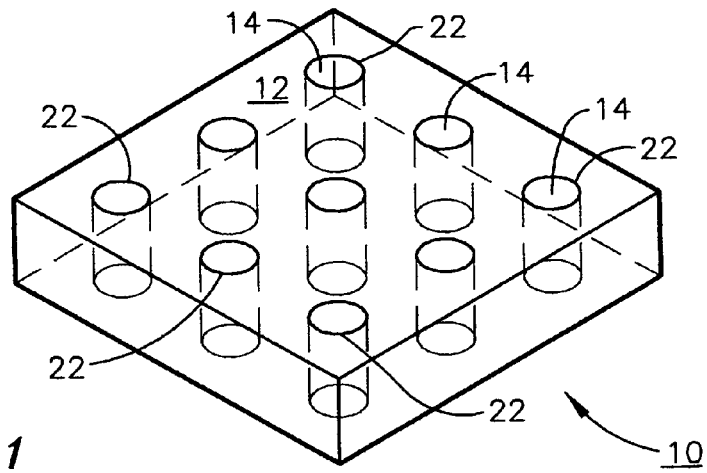
FIG. 1 depicts a phantom view of a pin reinforced composite foam in accordance with the present invention.
Figure 2:
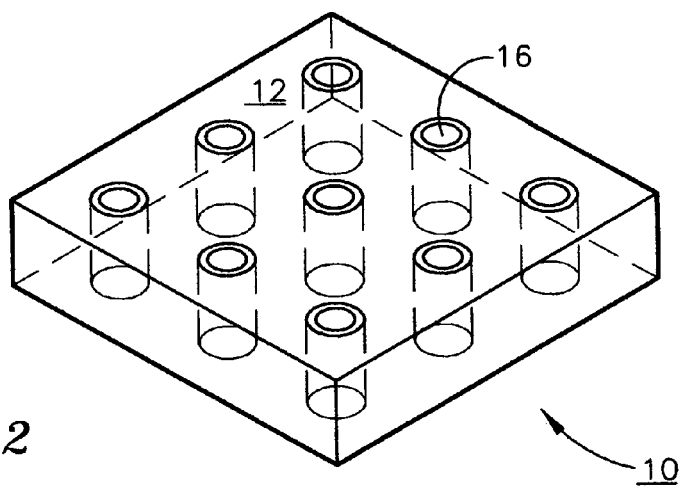
FIG. 2 depicts a phantom view of a tube reinforced composite foam in accordance with the present invention.

One morphology of the pin reinforced polymer foam of the present invention is shown in FIG. 1. As shown in this Figure, the reinforced structural foam of the present invention 10 comprises a polymeric matrix 12, having pins 14 inserted therein. A second morphology of the reinforced polymeric foam of the present invention is depicted in FIG. 2. In this Figure, the reinforcing mechanism comprises tubes or elongated hollow structures 16 inserted into polymer matrix 12.

Figure 3:
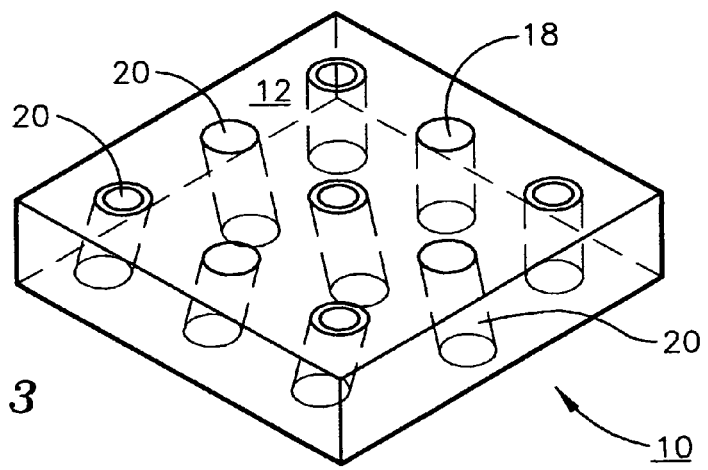
FIG. 3 depicts a phantom view of an off-axis pin/tube reinforced composite foam in accordance with the present invention.
Figure 4:
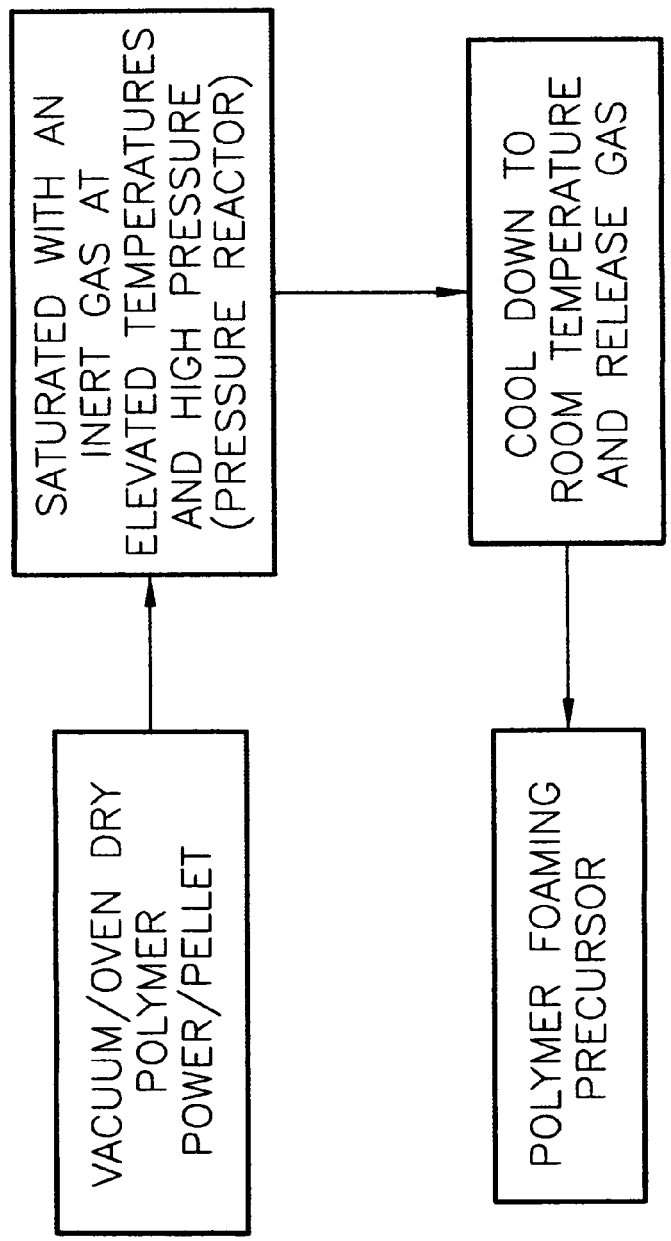
FIG. 4 is a process flow diagram for the producing of foaming precursor in accordance with the present invention.
Figure 5:
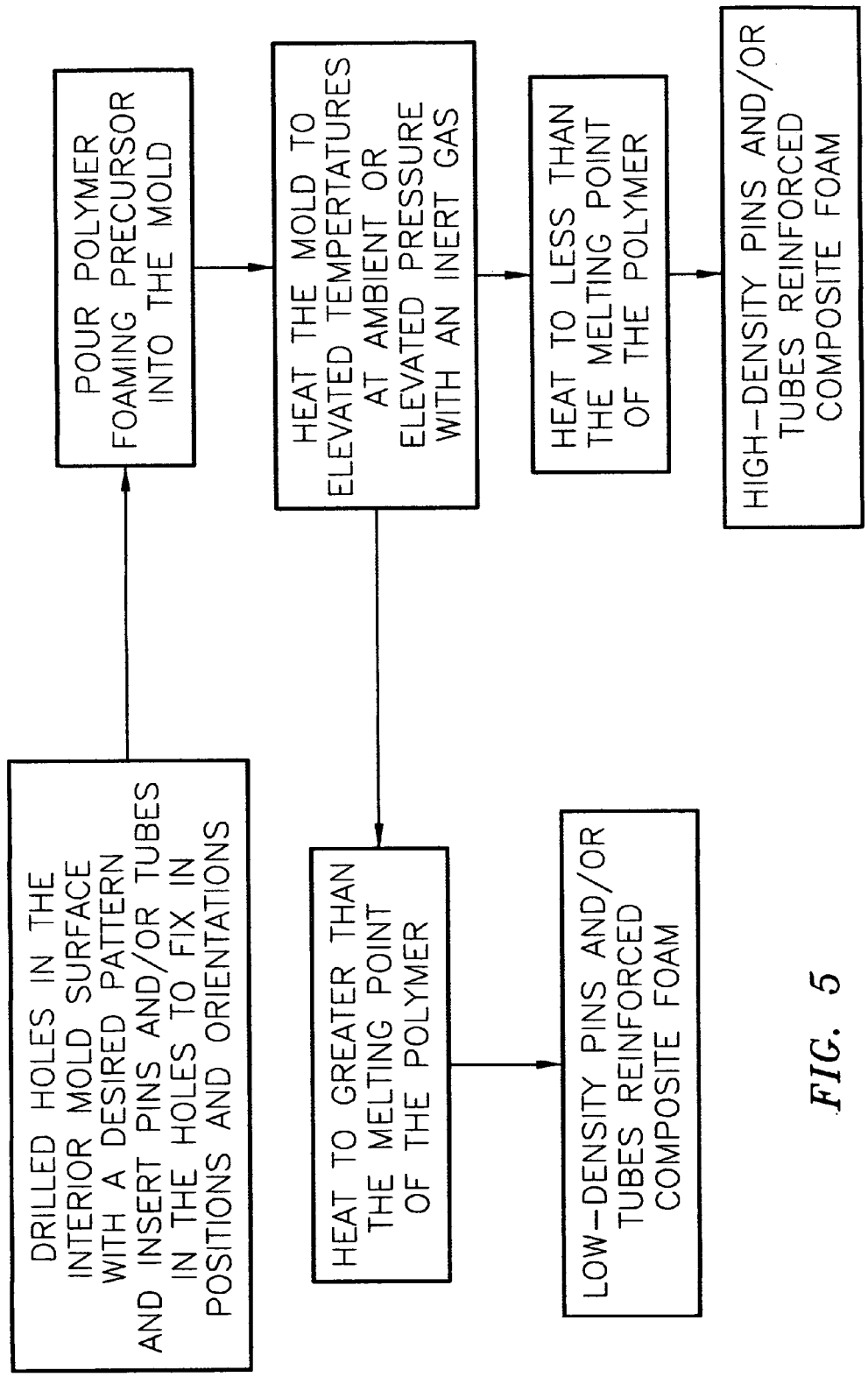
FIG. 5 shows the flow diagram for the one-step process for the manufacture of the pin and/or tube reinforced composite foam of the present invention.

While pins 12 and tubes 16 can be oriented in a vertical direction, i.e. perpendicular to the in-plane direction of the foam as shown in FIGS. 1 and 2, they may also be oriented at any other suitable or desired inclined or horizontal angle. FIG. 3 illustrates a polymer foam matrix 12 containing pins/tubes aligned in vertical 18 and off-axis 20 angles. In this Figure, pins/tubes 18 are oriented perpendicular to the in-plane direction of the foam while those pins/tubes angularly oriented with respect to the plane of foam matrix 12 are designated 20. The inclination angle $\theta$ denotes the angle of inclination of tubes or pins 18 inclined clockwise while inclination angle $\phi$ denotes the angle of inclination of those inclined in a counterclockwise direction. Pins/tubes 18 aligned in a vertical direction have the best performance to carry vertical compression loading. If a sandwich structure or foam needs to carry shear load it should be reinforced with pins/tubes 18 aligned at off-axis angles a shown in FIG. 3. An inclination angle (clockwise or counter clockwise) of 45° has the best performance to carry a shear load. Preferably, pins/tubes 18 should be arranged in a balanced manner, i.e., ±45°. The inclination of pins/tubes 18 can be at any angle from the vertical axis, i.e. between 0 and 90°, but are preferably inclined at angles between 0 and 45°.

According to a highly preferred embodiment of the present invention, reinforcing pins/tubes 14, 16, 18 and 20 are coated with a suitable adhesive 22 as depicted in FIG. 1 to assure proper bonding between pins/tubes 14, 16 and 18 and polymer foam matrix 12. Such a coating 22 on the surface of pins 14 is depicted in FIG. 1. Suitable adhesives include but are not limited to structural adhesives, elastomers, RTV, polyurethanes, epoxies, common household adhesives, wood adhesives, superglue, etc. In fact, any adhesive material is compatible with foam matrix 12, adheres to pins/tubes 14, 16, 18 and 20 and improves the structural properties of reinforced foam 10 is preferably utilized.

Materials suitable for pins or tubes 14, 16, 18 and 20 may include, but are not limited to, graphite, carbon, reinforced resin composites wherein the fiber may be graphite/carbon, glass, para-aramid, polybenzobisoxazole (PBO), ultra high modulus polyethylene fiber, Basalt fiber, ceramics, metals, superalloy, hybrid, nanowires, nanofibers, and nanotubes. Suitable tube and pins also include those manufactured from metals like titanium, aluminum alloy, steels, stainless steels, inconel, brass, etc., or any kind of ceramics and oxide. The diameter of the pins can be within the range of 0.005 and 0.15 inch and is preferably between 0.01 and 0.06 inch. The outside diameter of the tubes can be within the range of 0.008 and 0.20 inch and is preferably between 0.01 and 0.12 inch. The inside diameter of the tubes can be within the range of 0.005 and 0.195 inch preferably between 0.008 and 0.115 inch. The modulus and the strength of the pins and/or tubes should be at least twice the values of those of the host foam matrix 12. In general, the modulus should be over 2 ksi and the strength should be over 200 psi. Even pins or tubes at the lower end values of this range are useful for the reinforcement of ultra-low density polymer foams. The areal density of the pins and/or tubes in polymer foam matrix 12 can be between 1 and 50 per inch, preferably between 2 and 10, in both directions.

Foam matrix 12 may comprise high performance and engineering polymers as defined hereinabove including, but not limited to, liquid crystalline polymers, crystalline polymers, semi-crystalline polymers, and amorphous polymers. Examples of polymers include, but not limited to, XYDAR®, polyphenylene sulfide (PPS), polyetheretherketone (PEEK®), poly(etherketoneketone) (PEKK®), polysulfone, polyethylene (PE), polyetheremide (ULTEM®), polypropylene (PP), polyethersulfone, polycarbonate, PMMA, polystyrene, polyurethanes (PU), polyisocyanurate (PIR), polyetheremide (PEI), shape memory polymers (SMP), etc. Foam matrix 12 may further include reinforcing particles, fibers, tubes, and whiskers of materials such as carbon, graphite, glass, para-aramid, polybenzobisoxazole (PBO), ultra high modulus polyethylene fiber, Basalt fiber, ceramics, metals, superalloy, oxides, nanowires, nanofibers, and nanotubes.

The reinforced polymeric foams of the present invention may be fabricated by a one or a two step process. In the one-step manufacturing technique the raw materials (polymers) are preferably in powder or small pellet form although they can also be in block form. This is because it is easier to control the shape and appropriate amount of materials used to fill the spaces among the pins and/or tubes. In this process, as described in greater detail in U.S. Pat. No. 6,232,354 which has been previously incorporated herein by reference in it entirety, the polymeric starting material is first saturated with an inert fluid in a pressure vessel at room or elevated temperatures. It is preferable to saturate the polymer at elevated temperatures between the Tg (glass transition temperature) and 100° C. above the melting temperature of the polymer. After the polymer is saturated with the inert fluid and cooled down it is ready for processing into pins/tubes reinforced composite foams. A filler can be blended with the polymer either before or after the high-pressure saturation step. Suitable fillers include ceramic particles like calcium carbonate, chopped fibers of glass, carbon, aramid, rigid-rods, metal powders, various kinds of nano-fibers, various kinds of nano-tubes, nanowires, or ceramic whiskers. The main purpose of the filler is to enhance the structural, thermal, or electrical properties and reduce the cost of the foams.

The gas-saturated foam precursor is then used to fill in the space among the pins and/or tubes previously situated in a suitable mold and the combination compressed by any suitable means (bars or pressurized gas). The mold may have all closed walls or an open wall, but requires some means to support or orient the pins/tubes suitably therein for further processing as described below. The mold is placed inside an oven or pressure vessel and pressurized with an inert gas between ambient and 500 psi, preferably between 50 and 200 psi. Such a relatively low-value gas pressure can assist in controlling the pores size uniformity. The mold containing the polymer foam precursor and reinforcing pins/tubes is then heated to a temperature between about 30° C. below to about 150° C. above the melting point of the polymer. Suitable heating mechanisms include furnaces, autoclaves, heating tapes/cartridges, microwaves, lasers, etc. After holding the heated mold at temperature for a period of between 1 minute to over 3 hours depending upon the thickness of the foam to be manufactured the pressure is released to ambient and the mold removed from the heating mechanism. The polymer expands into foam with the pins and/or tubes embedded to become a reinforced composite foam. Any deviation in the soaking time should be considered as within the scope of this invention. The density of the reinforced composite foam can be controlled from about 1 pcf (pound/cubic-foot) to 50 pcf or higher by varying the heating time and temperature as well as other variables as described in U.S. Pat. No. 6,232,354. The pore size can also be controlled from a few microns to several millimeters in diameter as described in that patent.

In the case of the one-step process just described, the interior surface of the mold should have shallow indents in a desired pattern to hold the pins and/or tubes in snug fit. The pins and/or tubes are preferably cleaned with an agent like acetone before being placed in the mold. Thus, in the one step process just described, once formed, the polymer foaming precursor is poured into a suitable mold including properly situated pins or tubes. Local compaction of the precursor can be performed preferably, but is not necessary. After the mold is closed it is heated inside an oven or pressure vessel at ambient pressure, preferably at a pressure between 20 and 200 psi, most preferably between 50 and 150 psi. Once the polymer precursor reaches its melting or softening temperature and soaks for a period of time between 2 minutes and 3 hours depending on the thickness of the part manufactured, the mold is removed from the heating device and cooled down to ambient temperature. It can be opened immediately after removing it from the heating device if desired.

In the case of two-step process, a foam is first formed by any technique, but preferably as described in U.S. Pat. No. 6,232,354, however, any commercially available polymer foams may be used. In this process, the pins are coated with a room-temperature or elevated-temperature curable adhesive. The pins/tubes are manually inserted into the foam by, for example, injection with a rivet gun or the like. The pins/tubes bond together with the foam matrix as an integrated composite foam after the adhesive is cured.

The following examples will serve to better illustrate the successful practice of the present invention.

Example 1

LCP powder were purchased from Amoco Chemicals (4500 McGinnis Ferry Rd., Alpharetta, Ga. 30202) under the trade name XYDAR®. XYDAR® foam precursors were prepared at temperatures between 250° C. and 400° C. Carbon dioxide was used to saturate the XYDAR® powder at pressures between 1000 psi and 5000 psi. Based on our foam processing experience the gas pressure can be as high as 12,000 if desired. A higher gas/fluid saturation pressure results in foam with lower density. The XYDAR® powder was gas saturated with CO2 gas at this range of temperatures for a period of time between 10-min to 24-hours. After cooling down to ambient the gas pressure was released. This completed the preparation of the foaming precursors.

A steel mold having four side walls about 0.5-in thick and 1-in tall; one bottom plate about 4 by 4-in and 0.5-in thick; and a cover about 4 by 4 by 0.5-in. was prepared. Small holes about 0.062-in were drilled in either the bottom plate or the cover at a spacing of 2 holes per inch. Aluminum tubes with an outer diameter of 0.062-in were purchased from McMaster-Carr (P.O. Box 94930, Cleveland, Ohio 44101) and used as reinforcements. These aluminum tubes were inserted into the holes of the mold. The gas-saturated LCP powder (foam precursor) was poured into the mold containing the aluminum tubes and heated inside a pressure vessel under 50-150 psi of nitrogen gas for a period of time between 1 and 90 minutes. The pressure is then released and the vessel opened. The mold is taken out of the vessel and the cover opened. It is found that the LCP foaming precursor expands and completely encapsulates the aluminum tubes to form a net-shape Al tube reinforced XYDAR® foam. The dimensions of this foam is 4 by 4 by 1-in. A high magnification study of the Al tube reinforced LCP foam shows that the Al tubes are maintained in precise locations and pattern in the foam matrix. The Al tubes are fully embedded in the LCP foam matrix. The density of the composite foam ranges from 9.4 and 12.1 pcf (pound/cubic-foot) depending the processing temperature. It has been found that the density of the aluminum tube reinforced XYDAR® foam can be controlled to between 4 and 80 pcf by using appropriate metal tubes and processing condition.

Repetition of the foaming procedures using a tube furnace instead of pressure vessel under a nitrogen gas pressure between 10 and 60 psi. shows virtually no difference in the resulting product except that pore size uniformity is not as good as those that in foams manufactured under a pressurized nitrogen gas environment. For example, foaming under nitrogen gas in a tube furnace under nitrogen gas at a pressure of between about 10 and about 60 psi provided useful aluminum tube reinforced foams. Repetition of this process under ambient pressure also produced useful aluminum tube reinforced foams, but the pore size distribution of the foam was not as uniform.

Example 2

Carbon pins are available commercially with various diameters including 0.039, 0.050, and 0.058-in. They are considerably lighter than aluminum pins. We purchased carbon pins from Hobby Lobby Int. (5614 Franklin Pike Circle, Brent Wood, Tenn. 37027). Using the two-step technique described above, carbon pin reinforced XYDAR foam that includes chopped-glass fibers purchased from Owens Corning, 165A11C, (One Owens Corning Parkway, Toledo, Ohio 43659), chopped-carbon fibers purchased from Hercules, Utah and Hexel Corporation and continuous carbon fibers purchased from BFG Industries, Inc. (90 Huger Street, Cheraw, S.C. 29520) was fabricated successfully.

Example 3

Figure 6:
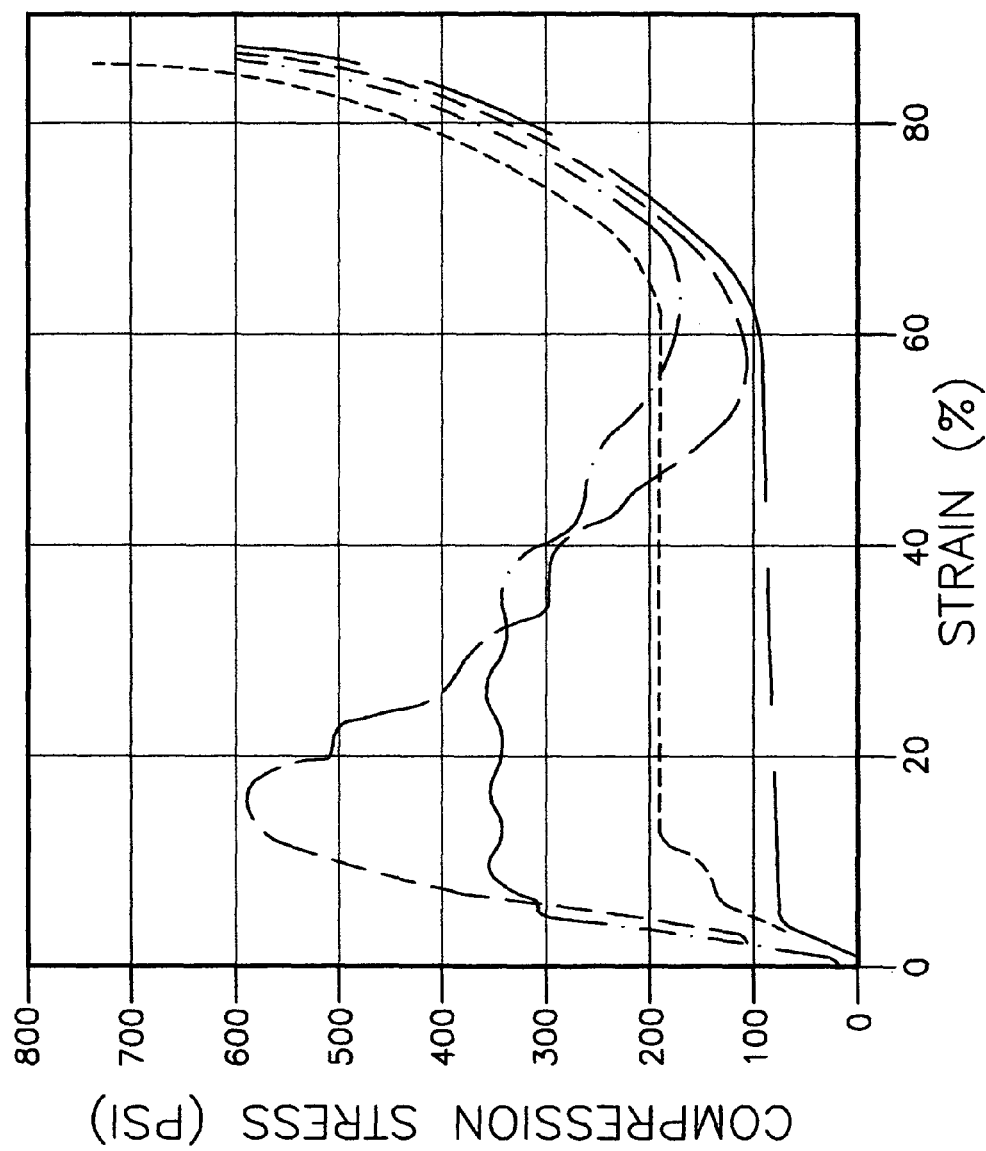
FIG. 6 shows a compression stress-strain curves for low-density LCP foams with and without carbon pin reinforcement.

Pin/tube reinforced LCP foam samples prepared as discussed in the previous examples are cut to near cubical shapes for compression testing. Their dimensions range from 1.0 to 1.3-in. Compression tests were performed by University of Dayton Research Institute. Compression loading was performed between two parallel platens using a hydraulic Instron machine. The compression load was applied at a slow rate of 0.05 in/min. The compression stress-strain relationships of carbon-pin reinforced LCP foams were compared to the same foam without pin reinforcement in FIG. 6. The density of the control foam specimen was 5.2 pcf. With the addition of carbon pins the densities of the reinforced foams increased to 6.2, 6.3, and 6.6 pcf, respectively. The yield strength of the LCP foam without pins is about 80 psi. It increases to 210, 380, and 602 psi with pin diameter of 0.039, 0.05, and 0.058-in, respectively. The strength to density ratio of the LCP foam without pin reinforcement is 15.4. The 602 psi yield strength of pin reinforced LCP foam (6.3 pcf) has a strength/density ratio of 95.6. This represents a dramatic and unexpected improvement of 6.2 times. After the specimens reach their yield point the strength drops somewhat. At about 60% of compression, of load carrying capabilities quite unexpectedly increase exponentially. The stress-strain curves show a hardening effect. Both specimens exhibit very high fracture toughness (area under the stress-strain curve). There is no sign of global brittle failure for the entire loading history as is normally observed for the state-of-the-art conventional polymer foams such as ROCHACELL®.

Additional specimens with a density of 5 pcf show strength to density ratios as high as 125. From these tests, it was found that the strength ratio, strength, and the modulus of the pin/tube reinforced XYDAR® foam also depends on the size of the pins/tubes and their pattern. It was contemplated that the strength ratio (strength/density) of the pin/tube reinforced composite foam can be over 250. This is considered a revolutionary improvement over the state-of-the-art.

Example 4

Figure 7:
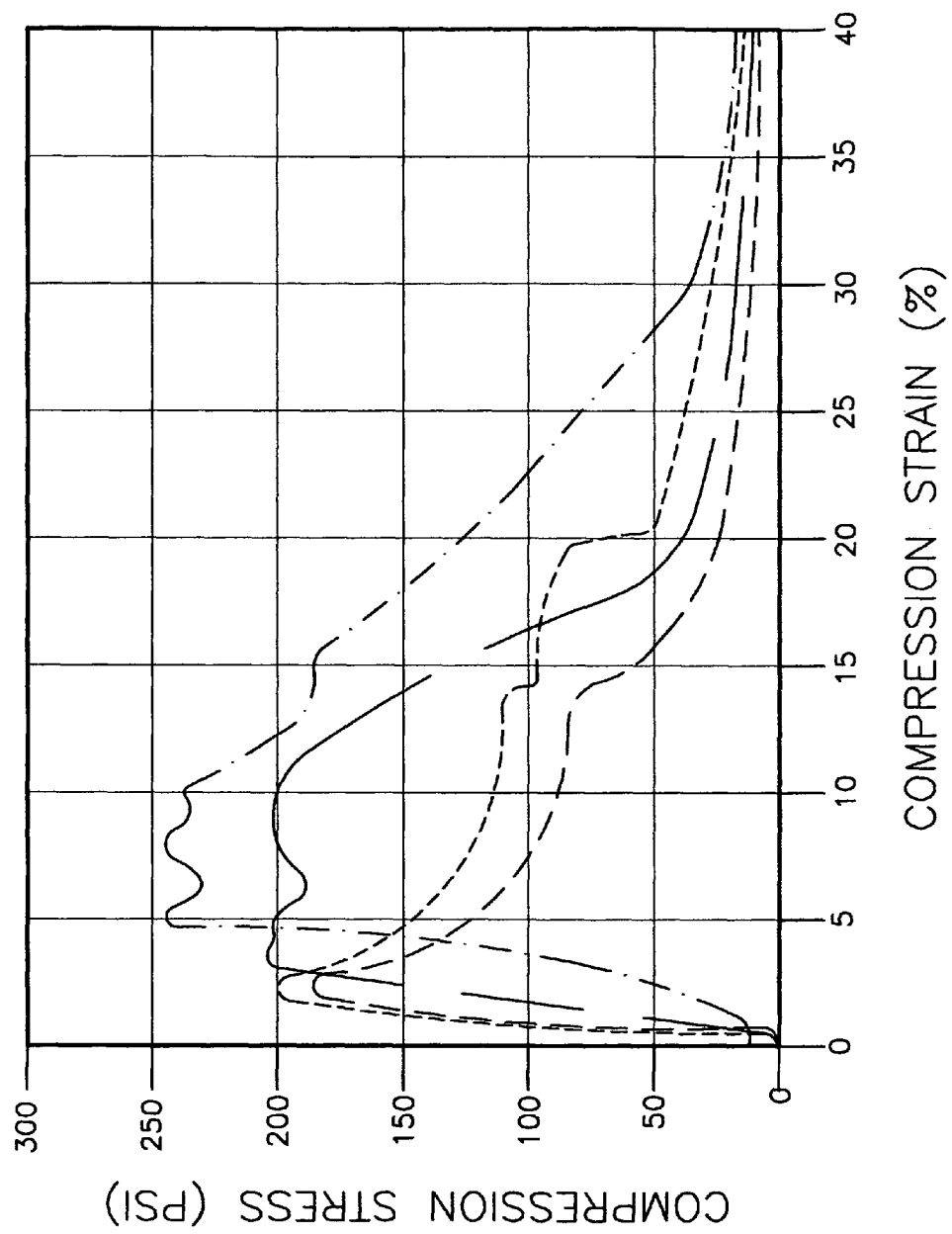
FIG. 7 shows a compression stress-strain curves for a sandwich structure with XYDAR® foam as the core material fabricated in accordance with the present invention.

Directionally reinforced LCP (XYDAR®) foams with densities as low as 3 pcf. reinforced with carbon pins, 0.039 and 0.05-in in diameter were processed and tested. Their compression stress-strain curves are shown in FIG. 7. There is also no sign of global brittle fracture for loading up to about 90% strain. The strength to density ratios of LCP foams with these kinds of carbon pins reinforcement are 65 and 70, respectively.

Example 5

The compression stress-strain curves of carbon pin reinforced XYDAR®, 3.38 pcf, at 250° F. demonstrate yield strengths and the strength to density ratios of 87.9 and 28.6, respectively. These values can be tripled with excellent reinforcing pin/tube alignment, appropriate diameter, pattern and density.

Example 6

A XYDAR® foam containing 5% of carbon fiber was manufactured according to the process described above. The foam sample, with a density of 4.50 pcf, was cut into three specimens about 1 by 1 by 1-in. Carbon pins with a diameter of 0.05-in were cut and used as the reinforcement. These were inserted into the foam at a density of 3 pins/in or 9 pins/sq.in. The carbon pins were inserted into the first specimen without an epoxy coating. The pins inserted into the second specimen were coated with Loctite epoxy purchased from Henkel Corporation, Avon, Ohio 44011. After the carbon pins were inserted into the XYDAR® foam the composite was cured in an oven at 65.5° C. for 30-min. The compression yield strengths of the XYFAR® foam without reinforcements, XYDAR® foam reinforced with uncoated carbon pins, and XYDAR® foam reinforced with epoxy-coated carbon pins are 52, 295, and 334 psi, respectively. Carbon pins coated with epoxy thus result in 13% improvement in compression yield strength.

Example 7

Figure 8:
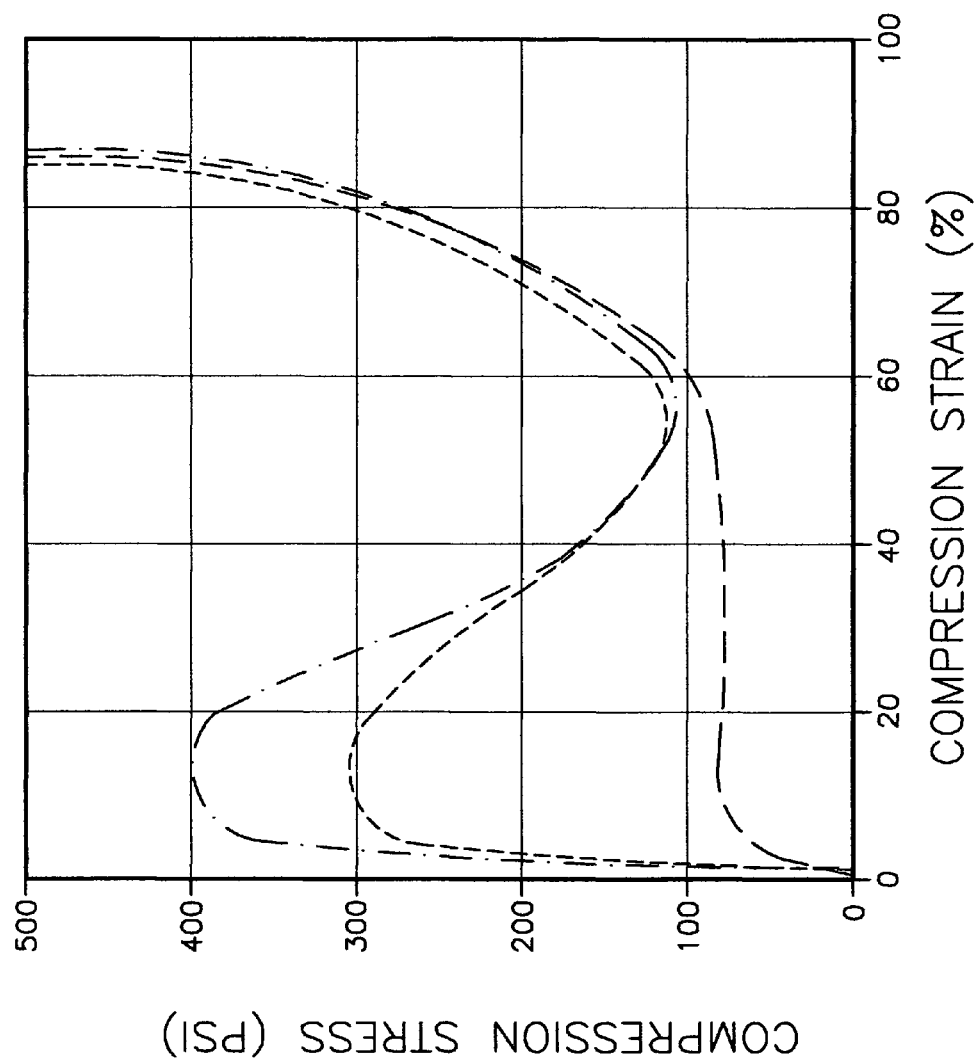
FIG. 8 shows a compression stress-strain curves for very-low density LCP foam reinforced with carbon pins.

Polyurethane (PU) foams (thermoset) were purchased from General Plastics Manufacturing Company (4910 Burlington Way, P.O. Box 9097, Tacoma, Wash. 98409). Foam samples, with a density of 4.10 pcf, was cut into three specimens about 1 by 1 by 1-in. Carbon pins 0.05-in in diameter were cut and used as the reinforcement. These were inserted into the foam at a density of 3 pins/in or 9 pins/sq.in. The carbon pins were inserted into the first specimen uncoated with an. The pins inserted into the second specimen were coated with Loctite epoxy purchased from Henkel Corporation, Avon, Ohio 44011. After the carbon pins were inserted into the PU foam it was cured in an oven at 65.5° C. for 30-min. The compression yield strength of the PU foam without reinforcement, PU foam reinforced with uncoated carbon pins, and PU foam reinforced with epoxy-coated carbon pins were 72, 303, and 406 psi, respectively. The use of carbon pins coated with epoxy thus result in 34% improvement in compression yield strength (see FIG. 8).

Example 8

Poly(methyl methacrylate)(PMMA) foams (thermoplastic) were manufactured in accordance with the process described in U.S. Pat. No. 6,232,354 B1 One foam sample, with a density of 1.70 pcf, was cut into three specimens about 1 by 1 by 1-in. Carbon pins with a diameter of 0.05-in were cut and used as the reinforcement. These were inserted into the foam at a density of 3 pins/in or 9 pins/sq.in. The carbon pins were inserted into the first specimen without an epoxy coating. The pins inserted into the second specimen were coated with Loctite epoxy purchased from Henkel Corporation, Avon, Ohio 44011. After the carbon pins were inserted into the PMMA foam it was cured in an oven at 65.5° C. for 30-min. The compression yield strength of the PMMA foam without reinforcement, PMMA foam reinforced with uncoated carbon pins, and PMMA foam reinforced with epoxy-coated carbon pins are 31, 234, and 269 psi, respectively. The use of carbon pins coated with epoxy result in 15% improvement in compression yield strength.

Example 9

A XYDAR® foam containing 3% of carbon fiber was manufactured according to the two step process described above. The foam sample, with a density of about 4.0 pcf, was cut into two specimens about 1 by 1 by 1-in. Carbon pins with a diameter of 0.05-in were cut and used as the reinforcement. These were inserted into the foam at a density of 3 pins/in or 9 pins/sq.in. The carbon pins inserted into the first XYDAR® foam specimen were not coated with epoxy. The carbon pins inserted into the second XYDAR® foam specimen were coated with Loctite epoxy purchased from Henkel. The samples were cured in an oven at 65.5° C. for 30-min. Both pin reinforced XYDAR® foam specimens were cut along a 30° direction using a radial arm saw. The pins in the first foam specimen were either pushed away or off from the specimen. The remaining portions became very loose. The second specimen, on the other hand, has a clean cut. All pins remained tightly in their original position. If the two portions were put together they appeared to be one piece without any damage due to the cutting. Therefore, pin/tube reinforced polymer foams manufacturing according to the instant invention have great structural integrity even after machining when the reinforcing pins/tubes are coated with adhesive. The optional approach using pins/tubes without adhesive coating, is convenient but has restricted utility.

Example 10

Sandwich specimens and structures were fabricated from this pin/tube reinforced polymer foams and facesheets. The facesheets were molded from graphite/epoxy using a compression molding technique. They can be fabricated by several other techniques including, but not limited to, autoclave. The facesheets were bonded to the pin/tube reinforced polymer foam with one of the adhesives mentioned previously. Such adhesives can be cured at room temperature overnight or in much shorter time at elevated temperature. A sandwich structure may consist of one or two facesheet and a core material. Other materials may be used for the facesheet including, but not limited to, those mentioned in paragraph 19 and resins mentioned in paragraph 20.

While the reinforced composite foams of the present invention have been described and shown largely in the context of a relatively planar structure, it will be apparent to the skilled artisan that the reinforced composite foams of the present invention can be formed in a mold of virtually any shape, curved as well as planar and that the reinforcing pins and tubes can be angularly oriented therein in virtually any direction to resist compressive forces that the reinforced composite foam might be expected to experience in its application.

There have thus been described several classes of structural foams reinforced with pins or tubes of a variety of materials that exhibit exceptional and totally unexpectedly high physical properties that are several multiples of those of the unreinforced base foam materials.

As the invention has been described, it will be apparent to those skilled in the art that the same may be varied in many ways without departing from the spirit and scope thereof. Any and all such modifications are intended to be included within the scope of the appended claims.

What is claimed is:
1. A process for the manufacture of a composite polymer foam comprising:
   A) saturating a polymer pellet or powder with an inert gas under conditions of elevated temperature of from about the glass transition temperature of the polymer to about 100° C. above the melting point of the polymer and elevated pressure;

B) lowering the temperature and releasing the pressure to yield a polymer foam precursor;

C) coating a plurality of pins or tubes with an adhesive;

D) placing the polymer foam precursor into a mold containing said plurality of reinforcing pins or tubes in fixed positions within the mold, wherein said pins or tubes possess an angle of inclination between 0° and 90'; and E) heating the mold containing the polymer foam precursor and the pins or tubes to a temperature between about 30° C. below to about 150° C. above the melting point of the polymer under an inert gas at elevated pressure between just above ambient to about 500 psi, thereby forming an integrated composite foam.

2. The process of claim 1 wherein said pins or tubes possess an angle of inclination between 1° and 45°.

3. The process of claim 1 further comprising the step of cleaning said pins or tubes prior to placing said pins or tubes in said mold.

4. The process of claim 1 wherein said mold includes shallow indents serving to hold said pins or tubes prior to placement.

5. The process of claim 1 wherein said mold includes holes serving to hold said pins or tubes prior to placement.

6. A process for the manufacture of a composite polymer foam comprising:

A) saturating a polymer pellet or powder with an inert gas under conditions of elevated temperature of from about the glass transition temperature of the polymer to about 100° C. above the melting point of the polymer and elevated pressure;

B) lowering the temperature and releasing the pressure to yield a polymer foam precursor;

C) placing the polymer foam precursor into a mold containing a plurality of reinforcing pins or tubes in fixed positions within the mold; said pins or tubes possess an angle of inclination between 0° and 90°; and D) heating the mold containing the polymer foam precursor and the pins or tubes to a temperature between about 30° C. below to about 150° C. above the melting point of the polymer under an inert gas at elevated pressure between just above ambient to about 500 psi.

7. The process of claim 6 wherein said mold includes shallow indents serving to hold said pins or tubes prior to placement.

8. The process of claim 6 wherein said mold includes holes serving to hold said pins or tubes prior to placement.

9. The process of claim 6 wherein the plurality of pins or tubes are coated with an adhesive.

10. The process of claim 6 wherein the polymer matrix comprises a polymer selected from the group consisting of: liquid crystalline polymers, crystalline polymers, semi-crystalline polymers, and amorphous polymers.

11. The process of claim 6 wherein the polymer matrix comprises a polymer selected from the group consisting of: polyphenylene sulfide, polyetheretherketone, poly(etherketoneketone), polysulfone, polyethylene, Polyetheremide, polypropylene, polyethersulfone, polycarbonate, polystyrene, polyurethanes, polyisocyanurate, polyetheremide, poly(methyl methacrylate) and shape memory polymers.

12. The process of claim 6 further including a filler in the polymer matrix wherein the filler is selected from the group consisting of: ceramic particles, chopped fibers of glass, carbon, aramid, rigid-rods, metal powders, nano-fibers, nano-tubes, nanowires, and ceramic whiskers.

13. The process of claim 6 wherein: the diameter of the pins is within the range of 0.005 and 0.15 inch; the outside diameter of the tubes is within the range of 0.008 and 0.20 inch; the inside diameter of the tubes is within the range of 0.005 and 0.195 inch; and the modulus of the pins or tubes is over 2 ksi and the strength of the pins or tubes is over 200 psi.

* * * * *